US012747350B2

(12) United States Patent
Zia et al.

(10) Patent No.: US 12,747,350 B2
(45) Date of Patent: Sep. 29, 2026

(54) FLAME RESISTANT POLYMER COMPOSITON AND ARTICLES MADE THEREFROM

(71) Applicant: Celanese International Corporation, Irving, TX (US)

(72) Inventors: Qamer Zia, Raunheim (DE); Dirk Zierer, Hattersheim (DE); Kirsten Markgraf, Weinheim (DE); Young Shin Kim, Cincinnati, OH (US)

(73) Assignee: Celanese International Corporation, Irving, TX (US)

( * ) Notice: Subject to any disclaimer, the term of this patent is extended or adjusted under 35 U.S.C. 154(b) by 103 days.

(21) Appl. No.: 16/913,606

(22) Filed: Jun. 26, 2020

(65) Prior Publication Data

US 2020/0407550 A1 Dec. 31, 2020

Related U.S. Application Data

(60) Provisional application No. 62/868,061, filed on Jun. 28, 2019.

(51) Int. Cl.
*C08L 67/02* (2006.01)

(52) U.S. Cl.
CPC ........... *C08L 67/02* (2013.01); *C08L 2201/02* (2013.01); *C08L 2207/04* (2013.01)

(58) Field of Classification Search
CPC .......... C08L 27/18; C08K 3/32; C08K 5/5313
See application file for complete search history.

(56) References Cited

U.S. PATENT DOCUMENTS

| | | | | |
|---|---|---|---|---|
| 2010/0298475 | A1* | 11/2010 | Wilson | C08L 69/00 524/125 |
| 2012/0289625 | A1 | 11/2012 | Matsuno et al. | |
| 2013/0190432 | A1* | 7/2013 | Krause | C08K 3/22 524/133 |
| 2016/0009918 | A1 | 1/2016 | Hoerold et al. | |
| 2016/0215122 | A1 | 7/2016 | Stockdale et al. | |
| 2016/0340588 | A1 | 11/2016 | Bauer et al. | |
| 2017/0121521 | A1 | 5/2017 | Ding et al. | |
| 2019/0153197 | A1 | 5/2019 | Krause et al. | |

FOREIGN PATENT DOCUMENTS

| | | | | |
|---|---|---|---|---|
| CN | 106133056 | A | 11/2016 | |
| CN | 108676511 | A * | 10/2018 | C08J 5/18 |
| DE | 102017215773 | A1 | 3/2019 | |
| EP | 3290470 | A1 | 3/2018 | |
| JP | S6256576 | A * | 3/1987 | |
| JP | 2006265539 | | 10/2006 | |
| JP | 2007119645 | | 5/2007 | |
| JP | 2011256277 | | 12/2011 | |
| JP | 2013538926 | | 10/2013 | |
| JP | 2013538926 | A | 10/2013 | |
| JP | WO2014199915 | | 2/2017 | |
| JP | WO2015098770 | | 3/2017 | |
| JP | 2019507227 | | 3/2019 | |
| JP | WO 2019069839 | | 10/2020 | |
| KR | 2009066599 | A * | 6/2009 | |
| KR | 20110044231 | A | 4/2011 | |
| WO | WO2012072739 | A1 | 6/2012 | |
| WO | WO2014199915 | A1 | 12/2014 | |
| WO | WO2015098770 | A1 | 7/2015 | |
| WO | WO2019069839 | A1 | 4/2019 | |

OTHER PUBLICATIONS

Machine translation of KR-2009066599-A (Year: 2009).*
Daikin (Polymer Additive Polyflon MPA FA-500H. (Year: 2018).*
ASTM D-4895 (Year: 2022).*
JIS K 6892 (Year: 2022).*
Topda (PTFE Micropowder TPD-505S) (Year: 2021).*
International Search Report and Written Opinion Corresponding to Applic. PC/US2020/039806 on Sep. 30, 2020.
European Search Report Corresponding to Application No. 20831643.0 on Jun. 22, 2023.
Taiwan Search Report Corresponding to Application No. 109121967 dated Jan. 3, 2024.
Japanese Office Action Corresponding to Application No. 2021-578013 on Apr. 30, 2024.
Notice of Allowance for application 2021-578013, mailed on Mar. 7, 2025, 3 pages.
Translation of Korean Office Action Corresponding to Application No. 10-2022-7002588 on Jun. 27, 2025.

* cited by examiner

*Primary Examiner* — Wenwen Cai
(74) *Attorney, Agent, or Firm* — Dority & Manning, P.A.

(57) ABSTRACT

Halogen-free, flame resistant polymer compositions are disclosed. The polymer composition contains a thermoplastic polymer, such as polybutylene terephthalate. The thermoplastic polymer is combined with a flame retardant that includes a phosphinate, a phosphite, and a nitrogen-containing synergist. In addition, the composition can contain a fluoropolymer and an organometallic compatibilizer. The flame resistant composition displays excellent flame resistance even when containing the thermoplastic polymer in amounts greater than 60% by weight.

21 Claims, No Drawings

FLAME RESISTANT POLYMER COMPOSITON AND ARTICLES MADE THEREFROM

RELATED APPLICATIONS

The present application is based upon and claims priority to U.S. Provisional Patent Application Ser. No. 62/868,061, having a filing date of Jun. 28, 2019, which is incorporated herein by reference.

BACKGROUND

Engineering thermoplastics and elastomeric materials are often used in numerous and diverse applications in order to produce molded parts and products. For instance, polyester polymers and polyester elastomers are used to produce all different types of molded products, such as injection molded products, blow molded products, and the like. Polyester polymers, for instance, can be formulated in order to be chemically resistant, to have excellent strength properties and, when formulating compositions containing polyester elastomers, to be flexible. Of particular advantage, polyester polymers can be melt processed due to their thermoplastic nature. In addition, polyester polymers can be recycled and reprocessed.

One problem faced by those skilled in the art in producing molded parts and products from thermoplastic polymers is the ability to make the articles flame resistant. Although almost a limitless variety of different flame retardants are marketed and sold commercially, selecting an appropriate flame retardant for a particular thermoplastic polymer composition is difficult and unpredictable. Further, many available flame retardants contain halogen compounds, such as bromine compounds, which can produce harsh chemical gases during production.

In view of the above, various halogen-free flame retardants have been developed and tested. In particular, various different phosphorus compounds have been used as flame retardants in thermoplastic polymer compositions. In order to meet certain requirements, however, the phosphorus compounds are typically combined with many other different adjuvants, such as other polymers and fillers. Phosphorus-based flame retardant packages, however, have had a tendency to severely and adversely impact the physical properties of the polymers, including the ability to melt process the polymers. In addition, many flame retardant packages do not provide sufficient flame resistance for many applications.

In view of the above, a need currently exists for a non-halogen flame retardant composition that can be used with thermoplastic polymers. A need also exists for a flame retardant composition for thermoplastic polymers that maintains various polymer properties, such as maintaining flow properties.

SUMMARY

In general, the present disclosure is directed to a polymer composition containing a thermoplastic polymer in conjunction with a fire retardant composition. The components of the fire retardant composition are carefully selected in order to produce a polymer composition having improved fire resistant properties. For example, the polymer composition can display a V-0 rating even at a thickness of 0.4 mm when tested according to Underwriters Laboratories Test 94. In addition, the components of the fire retardant composition are also selected so as to maintain various physical properties of the polymer composition.

In one embodiment, for instance, the present disclosure is directed to a flame resistant polymer composition that contains a thermoplastic polymer. The thermoplastic polymer can be present in the polymer composition generally in an amount greater than about 40% by weight, such as in an amount greater than about 60% by weight, such as in an amount greater than about 65% by weight, such as in an amount greater than about 70% by weight, such as in an amount greater than about 75% by weight. Any suitable thermoplastic polymer may be used in the polymer composition of the present disclosure, such as polyolefins, polyamides, and polyester polymers. The flame retardant composition of the present disclosure, however, is particularly well suited for blending with polyester polymers, such as polybutylene terephthalate.

In accordance with the present disclosure, the thermoplastic polymer is combined with a flame retardant composition comprising a combination of a metal phosphinate, a metal phosphite, and a nitrogen-containing synergist. The metal phosphite, for instance, may comprise aluminum phosphite having the following formula: $Al_2(HPO_3)_3$. The metal phosphinate, on the other hand, may be a dialkyl phosphinate, such as aluminum diethyl phosphinate. The nitrogen-containing synergist can comprise a melamine, such as melamine cyanurate. In one aspect, the metal phosphinate is present in the polymer composition in an amount from about 5% to about 30% by weight, such as from about 10% to about 25% by weight, such as in an amount from about 12% to about 19% by weight. The metal phosphite can be present in the polymer composition generally in an amount from about 0.5% to about 9% by weight, such as from about 1% to about 7% by weight, such as from about 2% to about 5% by weight. The nitrogen-containing synergist, on the other hand, can be present in the polymer composition generally in an amount from about 0.01% to about 7% by weight, such as from about 0.3% to about 4% by weight, such as from about 0.5% to about 2.3% by weight.

The flame resistant polymer composition can further contain a polytetrafluoroethylene. The polytetrafluoroethylene, for instance, can be present in the polymer composition in an amount from about 0.1% to about 5% by weight.

The flame resistant polymer composition can also contain an organometallic compatibilizer. The organometallic compatibilizer, for instance, may be a titanate. One example of a titanate that may be used is titanium IV 2-propanolato,tris (dioctyl)phosphato-O. The organometallic compatibilizer can be present in the polymer composition generally in an amount from about 0.05% to about 2.5% by weight. The flame resistant polymer composition can also contain an ester of a carboxylic acid. For example, the ester may be formed by reacting montanic acid with a multifunctional alcohol. The multifunctional alcohol may be ethylene glycol or glycerine. The ester of a carboxylic acid can be present in the polymer composition generally in an amount from about 0.05% to about 8% by weight. In one aspect, the flame resistant polymer composition can be formulated so as to be free of metal oxides, metal hydroxides, metal borates, and metal stannates. In the past, these components were typically used as a flame retardant adjuvant and were taught as being necessary in many formulations. Eliminating one or more of the above components, however, has been found to produce a polymer composition with better physical properties, including flow properties.

For example, the flame resistant polymer composition of the present disclosure can have a melt flow rate of at least 4 $cm^3/10$ min, such as greater than about 5 $cm^3/10$ min, such as greater than about 10 $cm^3/10$ min when tested at 250° C. and at a load of 2.16 kg. In the past, adding a phosphorus-based flame retardant package to a thermoplastic polymer had a tendency to significantly and adversely impact the flow properties of the polymer. Thus, in the past, the melt flow rate was tested at 275° C. in order to be able to measure the melt flow index. Flame resistant polymer compositions of the present disclosure, however, can be formulated and can display adequate flow properties at lower temperatures, such as 250° C.

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a halogen-free, flame resistant polymer composition. Polymer compositions made in accordance with the present disclosure not only demonstrate superior flammability ratings when tested according to Underwriters Laboratories Tests but also have excellent mechanical properties, including polymer processing properties. The flame retardant composition combined with a thermoplastic polymer in accordance with the present disclosure includes selected components that have been found to synergistically work together. The flame retardant composition can also be formulated so that various flame retardant adjuvants used in the past can be excluded without compromising the flame resistant properties of the polymer composition. In fact, excluding certain components has been found to maintain various physical properties of the composition, such as the melt flow characteristics of the composition.

In general, the flame resistant polymer composition of the present disclosure contains a suitable thermoplastic polymer, such as polybutylene terephthalate, combined with a flame retardant composition that contains a metal phosphinate, a metal phosphite, and a nitrogen-containing synergist. In addition, the composition can contain a fluoropolymer, such as polytetrafluoroethylene. The flame resistant polymer composition can also contain an organometallic compatibilizer. The organometallic compatibilizer is not only believed to improve the flame resistant properties of the composition but also can dramatically and unexpectedly improve the flow properties of the polymer composition when heated.

The flame resistant polymer composition of the present disclosure can also be formulated without containing various flame retardant adjuvants used in the past. For instance, the flame resistant polymer composition of the present disclosure can be formulated without containing a metal oxide, a metal hydroxide, a metal borate, and/or a metal stannate. For example, the flame resistant polymer composition of the present disclosure, in one aspect, can be formulated without containing magnesium oxide, calcium oxide, aluminum oxide, zinc oxide, manganese oxide, tin oxide, aluminum hydroxide, boehmite, dihydrotalcite, hydrocalumite, magnesium hydroxide, calcium hydroxide, zinc hydroxide, tin oxide hydrate, manganese hydroxide, zinc borate, basic zinc silicate, or zinc stannate. In the past, it was believed that one of the above components was necessary in certain applications in order to obtain lower flammability ratings. The above fillers, however, can interfere with various physical properties of the polymer composition.

As described above, the polymer composition generally contains a thermoplastic polymer. In general, any suitable thermoplastic polymer may be used. The thermoplastic polymer may be, for instance, a polyamide, a polyolefin such as an ethylene polymer or a propylene polymer, a polyester polymer, a polycarbonate polymer, or the like. The flame retardant composition of the present disclosure, however, is particularly well suited for use with a polyester polymer.

The polyesters which are suitable for use herein are derived from an aliphatic or cycloaliphatic diol, or mixtures thereof, containing from 2 to about 10 carbon atoms and an aromatic dicarboxylic acid, i.e., polyalkylene terephthalates.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with the aromatic dicarboxylic acid.

Examples of aromatic dicarboxylic acids include isophthalic or terephthalic acid, 1,2-di(p-carboxyphenyl)ethane, 4,4'-dicarboxydiphenyl ether, etc., and mixtures of these. All of these acids contain at least one aromatic nucleus. Fused rings can also be present such as in 1,4- or 1,5- or 2,6-naphthalene-dicarboxylic acids. In one embodiment, the dicarboxylic acid is terephthalic acid or mixtures of terephthalic and isophthalic acid.

Polyesters that may be used in the polymer composition, for instance, include polyethylene terephthalate, polybutylene terephthalate, mixtures thereof and copolymers thereof.

The thermoplastic polymer such as a polybutylene terephthalate polymer is present in the polymer composition in an amount sufficient to form a continuous phase. For example, the thermoplastic polymer may be present in the polymer composition in an amount of at least about 40% by weight, such as in an amount of at least about 60% by weight, such as in an amount of at least 65% by weight, such as in an amount of at least about 70% by weight, such as at least about 75% by weight, such as at least about 80% by weight. The thermoplastic polymer is generally present in an amount less than about 97% by weight.

In accordance with the present disclosure, at least one thermoplastic polymer as described above is combined with a flame retardant composition in accordance with the present disclosure. The flame retardant composition contains a metal phosphinate, a metal phosphite, and a nitrogen-containing synergist.

The metal phosphinate, for instance, may be a dialkyl phosphinate and/or a diphosphinate. The metal phosphinate may have one of the following chemical structures:

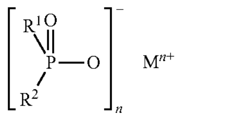

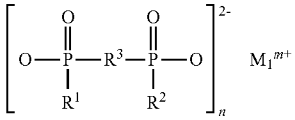

in which $R^1$, $R^2$ are the same or different and are each linear or branched $C_1$-$C_6$-alkyl; $R^3$ is linear or branched $C_1$-$C_{10}$-alkylene, $C_6$-$C_{10}$-arylene, $C_7$-$C_{20}$-alkylarylene or $C_7$-$C_{20}$-arylalkylene; M is Mg, Ca, Al, Sb, Sn, Ge, Ti, Zn, Fe, Zr, Ce, Bi, Sr, Mn, Li, Na, K and/or a protonated nitrogen base; m is 1 to 4; n is 1 to 4; x is 1 to 4.

In one embodiment, the metal phosphinate is a metal dialkylphosphinate, such as aluminum diethylphosphinate. The metal phosphinate can be present in the polymer composition generally in an amount greater than about 5% by weight, such as in an amount greater than about 10% by weight, such as in an amount greater than about 15% by weight, such as in an amount greater than about 20% by weight, and generally in an amount less than about 25% by weight, such as in an amount less than about 22% by weight, such as in an amount less than about 19% by weight, such as in an amount less than about 17% by weight, such as in an amount less than about 14% by weight. In one embodiment, the metal phosphinate is present in the polymer composition in an amount from about 12% to about 19% by weight.

The metal phosphite present in the polymer composition can be any suitable metal phosphite made from any of the metals (M) identified above. In one aspect, the metal phosphite is an aluminum phosphite. The aluminum phosphite can have the following chemical structure: $Al_2(HPO_3)_3$. Other forms of aluminum phosphite may also be present in the polymer composition. Such other forms include basic aluminum phosphite, aluminum phosphite tetrahydrate, and the like. In still another embodiment, the aluminum phosphite may have the formula: $Al(H_2PO_3)_3$.

The metal phosphite is believed to synergistically work with the metal phosphinate in improving the flame resistant properties of the polymer composition, especially when the polymer composition contains a polybutylene terephthalate. The weight ratio between the metal phosphinate and the metal phosphite can generally be from about 10:8 to about 30:1, such as from about 10:1 to about 20:1, such as from about 14:1 to about 18:1. In one aspect, the metal phosphite may be present in the polymer composition in an amount greater than about 0.5% by weight, such as in an amount greater than about 1% by weight, such as in an amount greater than about 1.5% by weight, such as in an amount greater than about 2% by weight, and generally in an amount less than about 10% by weight, such as in an amount less than about 7% by weight, such as in an amount less than about 5% by weight, such as in an amount less than about 3% by weight.

The nitrogen-containing synergist present in combination with the metal phosphinate and the metal phosphite can comprise a melamine. For instance, the nitrogen-containing synergist may comprise melamine cyanurate. Other melamine compounds that may be used include melamine polyphosphate, dimelamine polyphosphate, melem polyphosphate, melam polyphosphate, melon polyphosphate, and the like. Other nitrogen-containing synergists that may be used include benzoguanamine, tris(hydroxyethyl)isocyanurate, allantoin, glycoluril, guanidine, or mixtures thereof. In general, only small amounts of the nitrogen-containing synergists need to be present in the polymer composition. For instance, the nitrogen-containing synergists can be present in the polymer composition in an amount less than about 4% by weight, such as in an amount less than about 3.4% by weight, such as in an amount less than about 2.3% by weight, such as in an amount less than about 1.8% by weight, such as in an amount less than about 1.5% by weight, and generally in an amount greater than about 0.1% by weight, such as in an amount greater than about 0.3% by weight, such as in an amount greater than about 0.8% by weight, such as in an amount greater than about 1.1% by weight.

In addition to a thermoplastic polymer and the flame retardant composition as described above, the polymer composition of the present disclosure can contain polytetrafluoroethylene and/or an organometallic compatibilizer.

For example, the flame resistant polymer composition of the present disclosure can contain a fluoropolymer, such as a polytetrafluoroethylene powder. The polytetrafluoroethylene particles, for instance, can have an average particle size of less than about 15 microns, such as less than about 12 microns, such as less than about 10 microns, such as less than about 8 microns. The average particle size of the polytetrafluoroethylene particles is generally greater than about 0.5 microns, such as greater than about 1 micron, such as greater than about 2 microns, such as greater than about 3 microns, such as greater than about 4 microns, such as greater than about 5 microns. Average particle size can be measured according to ISO Test 13321.

In one embodiment, the polytetrafluoroethylene particles can have a relatively low molecular weight. The polytetrafluoroethylene polymer may have a density of from about 300 g/I to about 450 g/I, such as from about 325 g/I to about 375 g/I when tested according to ASTM Test D4895. The polytetrafluoroethylene particles can have a specific surface area of from about 5 $m^2/g$ to about 15 $m^2/g$, such as from about 8 $m^2/g$ to about 12 $m^2/g$ when tested according to Test DIN66132. The melt flow rate of the polytetrafluoroethylene polymer can be less than about 3 g/10 min, such as less than about 2 g/10 min when tested according to ISO Test 1133 when carried out at 372° C. with a load of 10 kg.

The polytetrafluoroethylene particles can be present in the polymer composition in an amount greater than about 0.1% by weight, such as in an amount greater than about 0.2% by weight, such as in an amount greater than about 0.3% by weight, such as in an amount greater than about 0.4% by weight. The polytetrafluoroethylene polymer is generally present in the polymer composition in an amount less than about 5% by weight, such as in an amount less than about 4% by weight, such as in an amount less than about 3% by weight, such as in an amount less than about 2% by weight.

When present in the polymer composition, the fluoropolymer as described above can provide various different benefits and advantages. For example, the fluoropolymer can improve various physical properties of molded products made from the polymer composition. In addition, the fluoropolymer can facilitate melt processing of the polymer composition. The fluoropolymer can also have flame resistant properties. For instance, the fluoropolymer can maintain the polymer composition as a coherent mass when exposed to an open flame and can inhibit the formation of droplets of molten polymer material from separating from the polymer composition during flame testing.

The polymer composition can also contain an organometallic compatibilizer. The organometallic compatibilizer has been found to unexpectedly and dramatically improve the flow properties of the polymer composition during polymer processing. In addition, the organometallic compatibilizer can provide various other benefits and advantages. For instance, the organometallic compatibilizer can provide anticorrosion properties, increase the acid resistance of the polymer composition, and can improve the long-term aging properties of the polymer composition. In addition, the organometallic compatibilizer can serve as an intumescent flame retardant in certain applications.

The organometallic compatibilizer may comprise a mono-alkoxy titanate. Other organometallic compounds that may be used include zirconates and aluminates. Specific examples of titanates that may be incorporated into the polymer composition include Titanium IV 2-propanolato, tris isooctadecanoato-O; Titanium IV bis 2-methyl-2-propenoato-O, isooctadecanoato-O 2-propanolato; Titanium IV 2-propanolato, tris(dodecyl)benzenesulfanato-O; Titanium IV 2-propanolato, tris(dioctyl)phosphato-O; Titanium IV, tris(2-methyl)-2-propenoato-O, methoxydiglycolylato; Titanium IV 2-propanolato, tris(dioctyl)pyrophosphato-O; Titanium IV, tris(2-propenoato-O), methoxydiglycolylato-O; Titanium IV 2-propanolato, tris(3,6-diaza)hexanolato, and mixtures thereof.

When present in the polymer composition, the organometallic compatibilizer can be included in an amount of generally greater than about 0.05% by weight, such as greater than about 0.1% by weight, such as greater than about 0.2% by weight, such as greater than about 0.4% by weight, and generally less than about 2.8% by weight, such as less than about 2.5% by weight, such as less than about 2.2% by weight, such as less than about 1.8% by weight, such as less than about 1.6% by weight, such as less than about 1.2% by weight.

The thermoplastic polymer composition of the present invention may also include a lubricant that constitutes from about 0.01 wt. % to about 2 wt. %, in some embodiments from about 0.1 wt, % to about 1 wt. %, and in some embodiments, from about 0.2 wt. % to about 0.5 wt. % of the polymer composition. The lubricant may be formed from a fatty acid salt derived from fatty acids having a chain length of from 22 to 38 carbon atoms, and in some embodiments, from 24 to 36 carbon atoms. Examples of such fatty acids may include long chain aliphatic fatty acids, such as montanic acid (octacosanoic acid), arachidic acid (arachic acid, icosanic acid, icosanoic acid, n-icosanoic acid), tetracosanoic acid (lignoceric acid), behenic acid (docosanoic acid), hexacosanoic acid (cerotinic acid), melissic acid (triacontanoic acid), erucic acid, cetoleic acid, brassidic acid, selacholeic acid, nervonic acid, etc. For example, montanic acid has an aliphatic carbon chain of 28 atoms and arachidic acid has an aliphatic carbon chain of 20 atoms. Due to the long carbon chain provided by the fatty acid, the lubricant has a high thermostability and low volatility. This allows the lubricant to remain functional during formation of the desired article to reduce internal and external friction, thereby reducing the degradation of the material caused by mechanical chemical effects.

The fatty acid salt may be formed by saponification of a fatty acid wax to neutralize excess carboxylic acids and form a metal salt, Saponification may occur with a metal hydroxide, such as an alkali metal hydroxide (e.g., sodium hydroxide) or alkaline earth metal hydroxide (e.g., calcium hydroxide). The resulting fatty acid salts typically include an alkali metal (e.g., sodium, potassium, lithium, etc.) or alkaline earth metal (e.g., calcium, magnesium, etc.). Such fatty acid salts generally have an acid value (ASTM D 1386) of about 20 mg KOH/g or less, in some embodiments about 18 mg KOH/g or less, and in some embodiments, from about 1 to about 15 mg KOH/g. Particularly suitable fatty acid salts for use in the present invention are derived from crude montan wax, which contains straight-chain, unbranched monocarboxylic acids with a chain length in the range of $C_{28}$-$C_{32}$. Such montanic acid salts are commercially available from Clariant GmbH under the designations Licomont® CaV 102 (calcium salt of long-chain, linear montanic acids) and Licomont® NaV 101 (sodium salt of long-chain, linear montanic acids).

If desired, fatty acid esters may be used as lubricants. Fatty acid esters may be obtained by oxidative bleaching of a crude natural wax and subsequent esterification of the fatty acids with an alcohol. The alcohol typically has 1 to 4 hydroxyl groups and 2 to 20 carbon atoms. When the alcohol is multifunctional (e.g., 2 to 4 hydroxyl groups), a carbon atom number of 2 to 8 is particularly desired. Particularly suitable multifunctional alcohols may include dihydric alcohol (e.g., ethylene glycol, propylene glycol, butylene glycol, 1,3-propanediol, 1,4-butanediol, 1,6-hexanediol and 1,4-cyclohexanediol), trihydric alcohol (e.g., glycerol and trimethylolpropane), tetrahydric alcohols (e.g., pentaerythritol and erythritol), and so forth. Aromatic alcohols may also be suitable, such as o-, m- and p-tolylcarbinol, chlorobenzyl alcohol, bromobenzyl alcohol, 2,4-dimethylbenzyl alcohol, 3,5-dimethylbenzyl alcohol, 2,3,5-cumobenzyl alcohol, 3,4,5-trimethylbenzyl alcohol, p-cuminyl alcohol, 1,2-phthalyl alcohol, 1,3-bis(hydroxymethyl)benzene, 1,4-bis(hydroxymethyl)benzene, pseudocumenyl glycol, mesitylene glycol and mesitylene glycerol. Particularly suitable fatty acid esters for use in the present invention are derived from montanic waxes. Licowax® OP (Clariant), for instance, contains montanic acids partially esterified with butylene glycol and montanic acids partially saponified with calcium hydroxide. Thus, Licowax® OP contains a mixture of montanic acid esters and calcium montanate. Other montanic acid esters that may be employed include Licowax® E, Licowax® OP, and Licolub® WE 4 (all from Clariant), for instance, are montanic esters obtained as secondary products from the oxidative refining of raw montan wax. Licowax® E and Licolub® WE 4 contain montanic acids esterified with ethylene glycol or glycerine.

Other known waxes may also be employed in a lubricant. Amide waxes, for instance, may be employed that are formed by reaction of a fatty acid with a monoamine or diamine (e.g., ethylenediamine) having 2 to 18, especially 2 to 8, carbon atoms. For example, ethylenebisamide wax, which is formed by the amidization reaction of ethylene diamine and a fatty acid, may be employed. The fatty acid may be in the range from $C_{12}$ to $C_{30}$, such as from stearic acid ($C_{18}$ fatty acid) to form ethylenebisstearamide wax. Ethylenebisstearamide wax is commercially available from Lonza, Inc, under the designation Acrawax® C, which has a discrete melt temperature of 142° C. Other ethylenebisamides include the bisamides formed from lauric acid, palmitic acid, oleic acid, linoleic acid, linolenic acid, oleostearic acid, myristic acid and undecalinic acid. Still other suitable amide waxes are N-(2-hydroxyethyl)12-hydroxystearamide and N,N'-(ethylene bis)12-hydroxystearamide, which are commercially available from CasChem, a division of Rutherford Chemicals LLC, under the designations Paricin® 220 and Paricin® 285, respectively.

The polymer composition may also contain at least one stabilizer. The stabilizer may comprise an antioxidant, a light stabilizer such as an ultraviolet light stabilizer, a thermal stabilizer, and the like.

Sterically hindered phenolic antioxidant(s) may be employed in the composition. Examples of such phenolic antioxidants include, for instance, calcium bis(ethyl 3,5-di-tert-butyl-4-hydroxybenzylphosphonate) (Irganox® 1425); terephthalic acid, 1,4-dithio-S,S-bis(4-tert-butyl-3-hydroxy-2,6-dimethylbenzyl) ester (Cyanox® 1729); triethylene glycol bis(3-tert-butyl-4-hydroxy-5-methylhydrocinnamate); hexamethylene bis(3,5-di-tert-butyl-4-hydroxyhydrocinnamate (Irganox® 259); 1,2-bis(3,5,di-tert-butyl-4-hydroxyhydrocinnamoyl)hydrazide (Irganox® 1024); 4,4'-di-tert-octyldiphenamine (Naugalube® 438R); phosphonic acid, (3,5-di-tert-butyl-4-hydroxybenzyl)-dioctadecyl ester (Irganox® 1093); 1,3,5-trimethyl-2,4,6-tris(3',5'-di-tert-butyl-4' hydroxybenzyl)benzene (Irganox® 1330); 2,4-bis (octylthio)-6-(4-hydroxy-3,5-di-tert-butylanilino)-1,3,5-triazine (Irganox® 565); isooctyl 3-(3,5-di-tert-butyl-4-hydroxyphenyl)propionate (Irganox® 1135); octadecyl 3-(3, 5-di-tert-butyl-4-hydroxyphenyl)propionate (Irganox® 1076); 3,7-bis(1,1,3,3-tetramethylbutyl)-10H-phenothiazine (Irganox® LO 3); 2,2'-methylenebis(4-methyl-6-tert-butylphenol)monoacrylate (Irganox® 3052); 2-tert-butyl-6-[1-(3-tert-butyl-2-hydroxy-5-methylphenyl)ethyl]-4-methylphenyl acrylate (Sumilizer® TM 4039); 2-[1-(2-hydroxy-3,5-di-tert-pentylphenyl)ethyl]-4,6-di-tert-pentylphenyl acrylate (Sumilizer® GS); 1,3-dihydro-2H-Benzimidazole (Sumilizer® MB); 2-methyl-4,6-bis[(octylthio)methyl]phenol (Irganox® 1520); N,N'-trimethylenebis-[3-(3,5-di-tert-butyl-4-hydroxyphenyl)propionamide (Irganox® 1019); 4-n-octadecyloxy-2,6-diphenylphenol (Irganox® 1063); 2,2'-ethylidenebis[4,6-di-tert-butylphenol] (Irganox® 129); N N'-hexamethylenebis(3,5-di-tert-butyl-4-hydroxyhydrocinnamamide) (Irganox® 1098); diethyl (3,5-di-tert-butyl-4-hydroxybenxyl)phosphonate (Irganox® 1222); 4,4'-di-tert-octyldiphenylamine (Irganox® 5057); N-phenyl-1-napthalenamine (Irganox® L 05); tris[2-tert-butyl-4-(3-ter-butyl-4-hydroxy-6-methylphenylthio)-5-methyl phenyl] phosphite (Hostanox® OSP 1); zinc dinonyidithiocarbamate (Hostanox® VP-ZNCS 1); 3,9-bis[1,1-diimethyl-2-[(3-tert-butyl-4-hydroxy-5-methylphenyl)propionyloxy]ethyl]-2,4, 8,10-tetraoxaspiro[5,5]undecane (Sumilizer® AG80); pentaerythrityl tetrakis[3-(3,5-di-tert-butyl-4-hydroxyphenyl) propionate] (Irganox® 1010); ethylene-bis(oxyethylene)bis [3-(5-tert-butyl-4-hydroxy-m-tolyl)-propionate (Irganox® 245); 3,5-di-tert-butyl-4-hydroxytoluene (Lowinox BHT, Chemtura) and so forth.

Some examples of suitable sterically hindered phenolic antioxidants for use in the present composition are triazine antioxidants having the following general formula:

(I)

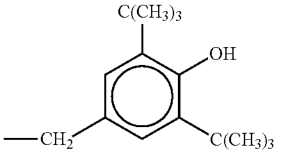

(II)

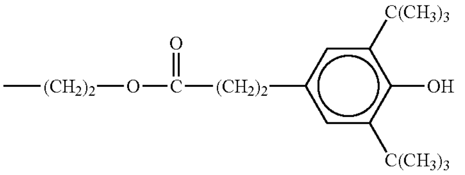

wherein, each R is independently a phenolic group, which may be attached to the triazine ring via a $C_1$ to $C_5$ alkyl or an ester substituent. Preferably, each R is one of the following formula (I)-(II):

(I)

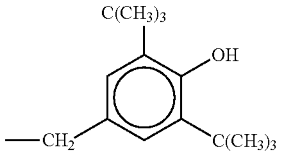

(II)

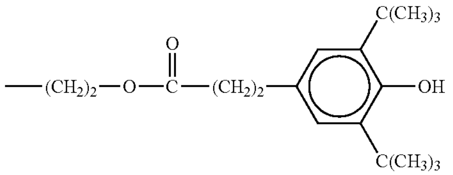

(III)

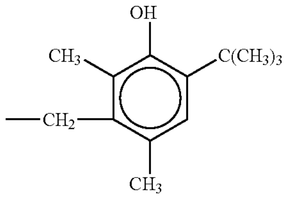

Commercially available examples of such triazine-based antioxidants may be obtained from American Cyanamid under the designation Cyanox® 1790 (wherein each R group is represented by the Formula III) and from Ciba Specialty Chemicals under the designations Irganox® 3114 (wherein each R group is represented by the Formula I) and Irganox® 3125 (wherein each R group is represented by the Formula II).

Sterically hindered phenolic antioxidants may constitute from about 0.01 wt. % to about 3 wt. %, in some embodiments from about 0.05 wt. % to about 1 wt. %, and in some embodiments, from about 0.05 wt, % to about 0.3 wt. % of the entire stabilized polymer composition. In one embodiment, for instance, the antioxidant comprises pentaerythrityl tetrakis[3-(3,5-di-tert-butyl-4-hydroxyphenyl)propionate.

Hindered amine light stabilizers ("HALS") may be employed in the composition to inhibit degradation of the polyester composition and thus extend its durability. Suitable HALS compounds may be derived from a substituted piperidine, such as alkyl-substituted piperidyl, piperidinyl, piperazinone, alkoxypiperidinyl compounds, and so forth. For example, the hindered amine may be derived from a 2,2,6,6-tetraalkylpiperidinyl. Regardless of the compound from which it is derived, the hindered amine is typically an oligorneric or polymeric compound having a number average molecular weight of about 1,000 or more, in some embodiments from about 1000 to about 20,000, in some embodiments from about 1500 to about 15,000, and in some embodiments, from about 2000 to about 5000. Such compounds typically contain at least one 2,2,6,6-tetraalkylpiperidinyl group (e.g., 1 to 4) per polymer repeating unit.

Without intending to be limited by theory, it is believed that high molecular weight hindered amines are relatively thermostable and thus able to inhibit light degradation even after being subjected to extrusion conditions, One particularly suitable high molecular weight hindered amine has the following general structure:

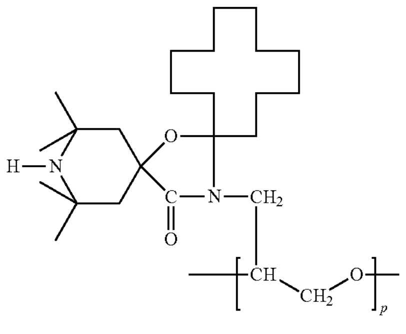

wherein, p is 4 to 30, in some embodiments 4 to 20, and in some embodiments 4 to 10. This oligomeric compound is commercially available from Clariant under the designation Hostavin® N30 and has a number average molecular weight of 1200.

Another suitable high molecular weight hindered amine has the following structure:

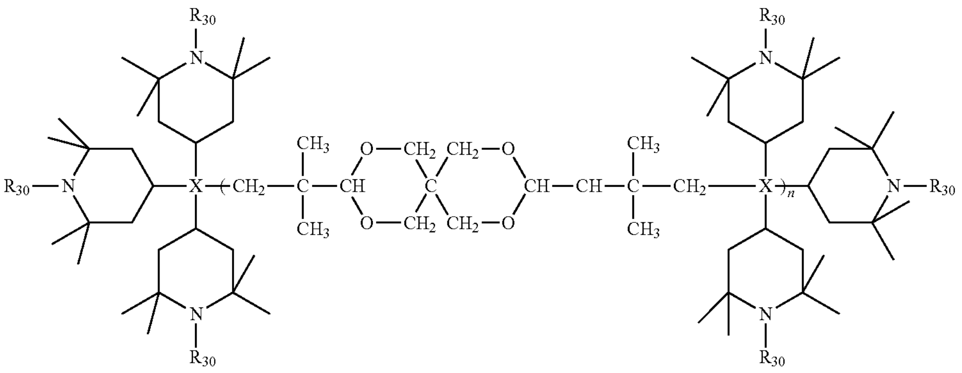

wherein, n is from 1 to 4 and $R_{30}$ is independently hydrogen or $CH_3$. Such oligomeric compounds are commercially available from Adeka Palmarole SAS (joint venture between Adeka Corp. and Palmarole Group) under the designation ADK STAB® LA-63 ($R_{30}$ is $CH_3$) and ADK STAB® LA-68 ($R_{30}$ is hydrogen).

Other examples of suitable high molecular weight hindered amines include, for instance, an oligomer of N-(2-hydroxyethyl)-2,2,6,6-tetramethyl-4-piperidinol and succinic acid (Tinuvin® 622 from Ciba Specialty Chemicals, MW=4000); oligomer of cyanuric acid and N,N-d (2,2,6,6-tetramethyl-4-piperidyl)-hexamethylene diamine; poly((6-morpholine-S-triazine-2,4-diyl)(2,2,6,6-tetramethyl-4-piperidinyl)-iminohexamethylene-(2,2,6,6-tetramethyl-4-piperidinyl)-imino) (Cyasorb® UV 3346 from Cytec, MW=1600); polymethylpropyl-3-oxy-[4(2,2,6,6-tetramethyl)-piperidinylysiloxane (Uvasil® 299 from Great Lakes Chemical, MW-1100 to 2500); copolymer of α-methylstyrene-N-(2,2,6,6-tetramethyl-4-piperidinyl)maleimide and N-stearyl maleimide; 2,4,8,10-tetraoxaspiro[5.5]undecane-3,9-diethanol tetramethyl-polymer with 1,2,3,4-butanetetracarboxylic acid; and so forth.

In addition to the high molecular hindered amines, low molecular weight hindered amines may also be employed in the composition. Such hindered amines are generally monomeric in nature and have a molecular weight of about 1000 or less, in some embodiments from about 155 to about 800, and in some embodiments, from about 300 to about 800.

Specific examples of such low molecular weight hindered amines may include, for instance, bis-(2,2,6,6-tetramethyl-4-piperidyl) sebacate (Tinuvin® 770 from Ciba Specialty Chemicals, MW=481); bis-(1,2,2,6,6-pentamethyl-4-piperidinyl)-(3,5-ditert.butyl-4-hydroxybenzyl)butyl-propane dioate; bis-(1,2,2,6,6-pentamethyl-4-piperidinyl)sebacate; 8-acetyl-3-dodecyl-7,7,9,9-tetramethyl-1,3,8-triazaspiro-(4,5)-decane-2,4-dione, butanedioic acid-bis-(2,2,6,6-tetramethyl-4-piperidinyl) ester; tetrakis-(2,2,6,6-tetramethyl-4-piperidyl)-1,2,3,4-butane tetracarboxylate; 7-oxa-3,20-diazadispiro(5.1.11.2) heneicosan-20-propanoic acid, 2,2,4,4-tetramethyl-21-oxo, dodecyl ester; N-(2,2,6,6-tetramethyl-4-piperidinyl)-N'-amino-oxamide; o-t-amyl-o-(1,2,2,6,6-pentamethyl-4-piperidinyl)-monoperoxi carbonate; β-alanine, N-(2,2,6,6-tetramethyl-4-piperidinyl), dodecylester, ethanediamide, N-(1-acetyl-2,2,6,6-tetramethylpiperidinyl)-N'-dodecyl; 3-dodecyl-1-(2,2,6,6-tetramethyl-4-piperidinyl)-pyrrolidin-2,5-dione; 3-dodecyl-1-(1,2,2,6,6-pentamethyl-4-piperidinyl)-pyrrolidin-2,5-dione; 3-dodecyl-1-(1-acetyl,2,2,6,6-tetramethyl-4-piperidinyl)-pyrrolidin-2,5-dione, (Sanduvar® 3058 from Clariant, MW=448.7); 4-benzoyloxy-2,2,6,6-tetramethylpiperidine; 1-[2-(3,5-di-tert-butyl-4-hydroxyphenylpropionyloxy) ethyl]-4-(3,5-di-tert-butyl-4-hydroxylphenyl propionyloxy)-2,2,6,6-tetramethyl-piperidine; 2-methyl-2-(2"2",6",6"-tetramethyl-4"-piperidinylamino)-N-(2',2' 6',6'-tetra-methyl-4'-piperidinyl)propionylamide; 1,2-bis-(3,3,5,5-tetramethyl-2-oxo-piperazinyl)ethane; 4-oleoyloxy-2,2,6,6-tetramethylpiperidine; and combinations thereof. Other suitable low molecular weight hindered amines are described in U.S. Pat. No. 5,679,733 to Malik, et al.

The hindered amines may be employed singularly or in combination in any amount to achieve the desired properties, but typically constitute from about 0.01 wt. % to about 4 wt. % of the polymer composition.

UV absorbers, such as benzotriazoles or benzopheones, may be employed in the composition to absorb ultraviolet light energy. Suitable benzotriazoles may include, for instance, 2-(2-hydroxyphenyl)benzotriazoles, such as 2-(2-hydroxy-5-methylphenyl)benzotriazole; 2-(2-hydroxy-5-tert-octylphenyl)benzotriazole (Cyasorb® UV 5411 from Cytec); 2-(2-hydroxy-3,5-di-tert-butylphenyl)-5-chlorobenzo-triazole; 2-(2-hydroxy-3-tert-butyl-5-methylphenyl)-5-chlorobenzotriazole; 2-(2-hydroxy-3,5-dicumylphenyl)benzotriazole; 2,2'-methylenebis(4-tert-octyl-6-benzotriazolylphenol); polyethylene glycol ester of 2-(2-hydroxy-3-tert-butyl-5-carboxyphenyl)benzotriazole; 2-[2-hydroxy-3-(2-acryloyloxyethyl)-5-methylphenyl]-benzotriazole; 2-[2-hydroxy-3-(2-methacryloyloxyethyl)-5-tert-butylpheny]benzotriazole; 2-[2-hydroxy-3-(2-methacryloyloxyethyl)-5-tert-octylphenyl]benzotriazole; 2-[2-hydroxy-3-(2-methacryloyloxyethyl)-5-tert-butylphenyl]-5-chlorobenzotriazole; 2-[2-hydroxy-5-(2-methacryloyloxyethyl)phenyl]benzotriazole; 2-[2-hydroxy-3-tert-butyl-5-(2-methacryloyloxyethyl)phenyl] benzotriazole; 2-[2-hydroxy-3-tert-amyl-5-(2-methacryloyloxyethyl)phenyl]benzotriazole; 2-[2-hydroxy-3-tert-butyl-5-(3-methacryloyloxypropyl)phenyl]-5-chlorobenzotriazole; 2-[2-hydroxy-4-(2-methacryloyloxymethyl)phenyl]benzotriazole; 2-[2-hydroxy-4-(3-methacryloyloxy-2-hydroxypropyl)phenyl] benzotriazole; 2-[2-hydroxy-4-(3-methacryloyloxypropyl) phenyl]benzotriazole, and combinations thereof.

Exemplary benzophenone light stabilizers may likewise include 2-hydroxy-4-dodecyloxybenzophenone; 2,4-dihydroxybenzophenone; 2-(4-benzoyl-3-hydroxyphenoxy) ethyl acrylate (Cyasorb® UV 209 from Cytec); 2-hydroxy-4-n-octyloxy)benzophenone (Cyasorb® 531 from Cytec); 2,2'-dihydroxy-4-(octyloxy)benzophenone (Cyasorb® UV 314 from Cytec); hexadecyl-3,5-bis-tert-butyl-4-hydroxybenzoate (Cyasorb® UV 2908 from Cytec); 2,2'-thiobis(4-tert-octylphenolato)-n-butylamine nickel(II) (Cyasorb® UV 1084 from Cytec); 3,5-di-tert-butyl-4-hydroxybenzoic acid, (2,4-di-tert-butylphenyl)ester (Cyasorb® 712 from Cytec); 4,4'-dimethoxy-2,2'-dihydroxybenzophenone (Cyasorb® UV 12 from Cytec); and combinations thereof.

When employed, UV absorbers may constitute from about 0.01 wt. % to about 4 wt. % of the entire polymer composition.

In one embodiment; the polymer composition may contain a blend of stabilizers that produce ultraviolet resistance and color stability. The combination of stabilizers may allow for products to be produced that have bright and fluorescent colors. In addition, bright colored products can be produced without experiencing significant color fading over time. In one embodiment, for instance, the polymer composition may contain a combination of a benzotriazole light stabilizer and a hindered amine light stabilizer, such as an oligomeric hindered amine.

Organophosphorus compounds may be employed in the composition that serve as secondary antioxidants to decompose peroxides and hydroperoxides into stable, non-radical products. Trivalent organophosphorous compounds (e.g., phosphites or phosphonites) are particularly useful in the stabilizing system of the present invention. Monophosphite compounds (i.e., only one phosphorus atom per molecule) may be employed in certain embodiments of the present invention. Preferred monophosphites are aryl monophosphites contain $C_1$ to $C_{10}$ alkyl substituents on at least one of the aryloxide groups. These substituents may be linear (as in the case of nonyl substituents) or branched (such as isopropyl or tertiary butyl substituents). Non-limiting examples of suitable aryl monophosphites (or monophosphonites) may include triphenyl phosphite; diphenyl alkyl phosphites; phenyl dialkyl phosphites; tris(nonylphenyl) phosphite (Weston™ 399, available from GE Specialty Chemicals); tris(2,4-di-tert-butylphenyl) phosphite (Irgafos® 168, available from Ciba Specialty Chemicals Corp.); bis(2,4-di-tert-butyl-6-methylphenyl)ethyl phosphite (Irgafos® 38, available from Ciba Specialty Chemicals Corp.); and 2,2',2"-nitrilo[triethyltris(3,3'5,5"-tetra-tert-butyl-1,1'-biphenyl-2,2'-diyl) phosphate (Irgafos® 12, available from Ciba Specialty Chemicals Corp.). Aryl diphosphites or diphosphonites (i.e., contains at least two phosphorus atoms per phosphite molecule may also be employed in the stabilizing system and may include, for instance; distearyl pentaerythritol diphosphite, diisodecyl pentaerythritol diphosphite, bis (2,4 di-tert-butylphenyl) pentaerythritol diphosphite (Irgafos 126 available from Ciba); bis(2,6-di-tert-butyl-4-methylpenyl)pentaerythritol diphosphite; bisisodecyloxypentaerythritol diphosphite, bis(2,4-di-tert-butyl-6-methylphenyl)pentaerythritol diphosphite, bis(2,4,6-tri-tert-butylphenyl) pentaerythritol diphosphite, tetrakis(2,4-di-tert-butylphenyl) 4,4'-biphenylene-diphosphonite (Sandostab™ P-EPQ, available from Clariant) and bis(2,4-dicumylphenyl)pentaerythritol diphosphite (Doverphos® S-9228).

Organophosphorous compounds may constitute from about 0.01 wt % to about 2 wt. %, in some embodiments from about 0.05 wt. % to about 1 wt. %, and in some embodiments, from about 0.1 wt. % to about 0.5 wt. % of the polymer composition.

In addition to those mentioned above, secondary amines may also be employed in the composition. The secondary amines may be aromatic in nature, such as N-phenyl naphthylamines (e.g., Naugard® PAN from Uniroyal Chemical); diphenylamines, such as 4,4'-bis(dimethylbenzyl)-diphenylamine (e.g., Naugard® 445 from Uniroyal Chemical); p-phenylenediamines (e.g., Wingstay® 300 from Goodyear); quinolones, and so forth. Particularly suitable secondary amines are oligomeric or polymeric amines, such as homo- or copolymerized polyamides. Examples of such polyamides may include nylon 3 (poly-β-alanine), nylon 6, nylon 10, nylon 11, nylon 12, nylon 6/6, nylon 6/9, nylon 6/10, nylon 6/11, nylon 6/12, polyesteramide, polyamideimide, polyacrylamide, and so forth. In one particular embodiment, the amine is a polyimide terpolymer having a melting point in the range from 120° C. to 220° C. Suitable terpolymers may be based on the nylons selected from the group consisting of nylon 6, nylon 6/6, nylon 619, nylon 6/10 and nylon 6/12, and may include nylon 6-66-69; nylon 6-66-610 and nylon 6-66-612. One example of such a nylon terpolymer is a terpolymer of nylon 6-66-610 and is commercially available from Du Pont de Nemours under the designation Elvamide® 8063R.

Secondary amines may constitute from about 0.01 wt. % to about 2 wt. A, of the entire polymer composition.

In addition to the above components, the polymer composition may include various other ingredients. Colorants that may be used include any desired inorganic pigments, such as titanium dioxide, ultramarine blue, cobalt blue, and other organic pigments and dyes, such as phthalocyanines, anthraquinones, and the like. Other colorants include carbon black or various other polymer-soluble dyes. The colorants can generally be present in the composition in an amount up to about 2 percent by weight.

The polymer composition may also contain reinforcing fibers in addition to the thermoplastic polymer matrix. Reinforcing fibers of which use may advantageously be made are mineral fibers, such as glass fibers, polymer fibers, in particular organic high-modulus fibers, such as aramid fibers, or metal fibers, such as steel fibers, or carbon fibers or natural fibers, fibers from renewable resources.

These fibers may be in modified or unmodified form, e.g. provided with a sizing, or chemically treated, in order to improve adhesion to the plastic. Glass fibers are particularly preferred.

Glass fibers are provided with a sizing to protect the glassfiber, to smooth the fiber but also to improve the adhesion between the fiber and the matrix material. A sizing usually comprises silanes, film forming agents, lubricants, wetting agents, adhesive agents optionally antistatic agents and plasticizers, emulsifiers and optionally further additives.

Specific examples of silanes are aminosilanes, e.g. 3-trimethoxysilylpropylamine, N-(2-aminoethyl)-3-aminopropyltrimethoxy-silane, N-(3-trimethoxysilanylpropyl)ethane-1,2-diamine, 3-(2-aminoethyl-amino)propyltrimethoxysilane, N-[3-(trimethoxysilyl)propyl]-1,2-ethane-diamine.

Film forming agents are for example polyvinylacetates, polyesters and polyurethanes. Sizings based on polyurethanes may be used advantageously.

The reinforcing fibers may be compounded into the polymer matrix, for example in an extruder or kneader.

According to one embodiment, the molding composition of the present disclosure comprises at least one reinforcing fiber which is a mineral fiber, preferably a glass fiber, more preferably a coated or impregnated glass fiber. Glass fibers which are suitable for the molding composition of the present disclosure are commercially available, e.g. Johns Manville, ThermoFlow® Chopped Strand 753, OCV Chopped Strand 408 A, Nippon Electric Glass Co. (NEG) Chopped Strand T-651.

Fiber diameters can vary depending upon the particular fiber used and whether the fiber is in either a chopped or a continuous form. The fibers, for instance, can have a diameter of from about 5 μm to about 100 μm, such as from about 5 μm to about 50 μm, such as from about 5 μm to about 15 μm. The length of the fibers can vary depending upon the particular application. For instance, the fibers can have a length of greater than about 100 microns, such as greater than about 200 microns, such as greater than about 300 microns, such as greater than about 350 microns. The length of the fibers can generally be less than about 1,000 microns, such as less than about 800 microns, such as less than about 600 microns, such as less than about 500 microns. Once incorporated into the polymer composition and molded into an article, the fiber length can decrease. For instance, the average fiber length in the final product can be from about 100 microns to about 400 microns, such as from about 100 microns to about 300 microns.

In general, reinforcing fibers are optionally present in the polymer composition in amounts sufficient to increase the tensile strength of the composition. The reinforcing fibers, for example, can be present in the polymer composition in an amount greater than about 2% by weight, such as in an amount greater than about 5% by weight, such as in an amount greater than about 10% by weight, such as in an amount greater than about 15% by weight, such as in an amount greater than about 20% by weight. The reinforcing fibers are generally present in an amount less than about 55% by weight, such as in an amount less than about 50% by weight, such as in an amount less than about 45% by weight, such as in an amount less than about 40% by weight, such as in an amount less than about 35% by weight, such as in an amount less than about 30% by weight.

The compositions of the present disclosure can be compounded and formed into polymer articles using any technique known in the art. For instance, the respective composition can be intensively mixed to form a substantially homogeneous blend. The blend can be melt kneaded at an elevated temperature, such as a temperature that is higher than the melting point of the polymer utilized in the polymer composition but lower than the degradation temperature. Alternatively, the respective composition can be melted and mixed together in a conventional single or twin screw extruder. Preferably, the melt mixing is carried out at a temperature ranging from 150 to 300° C., such as from 200 to 280° C., such as from 220 to 270° C. or 240 to 260° C. However, such processing should be conducted for each respective composition at a desired temperature to minimize any polymer degradation.

After extrusion, the compositions may be formed into pellets. The pellets can be molded into polymer articles by techniques known in the art such as injection molding, thermoforming, blow molding, rotational molding and the like. According to the present disclosure, the polymer articles demonstrate excellent tribological behavior and mechanical properties. Consequently, the polymer articles can be used for several applications where low wear and excellent gliding properties are desired.

Polymer compositions in accordance with the present disclosure can have excellent flame resistant properties in addition to physical properties. For instance, when tested according to Underwriters Laboratories Test 94 according to the Vertical Burn Test, test plaques made according to the present disclosure can have a UL-94 rating of V-0, even when tested at a thickness of 0.8 mm or even at a thickness of 0.4 mm.

Of particular advantage, flame resistant polymer compositions can be formulated in accordance with the present disclosure with excellent flow properties. For example, when tested according to ISO Test 1133 at a temperature of 250° C. and at a load 2.16 kg, the overall polymer composition can have a melt flow rate of greater than about 3 $cm^3$/10 min, such as greater than about 4 $cm^3$/10 min, such as greater than about 5 $cm^3$/10 min, such as greater than about 6 $cm^3$/10 min, such as greater than about 7 $cm^3$/10 min, such as greater than about 8 $cm^3$/10 min, such as greater than about 9 $cm^3$/10 min, such as greater than about 10 $cm^3$/10 min. The melt flow rate is generally less than about 50 $cm^3$/10 min.

The polymer composition of the present disclosure can also have excellent mechanical properties when tested according to ISO Test No. 527. For example, the polymer composition can have a tensile modulus of greater than about 3,400 $N/mm^2$ and generally less than about 5,000 $N/mm^2$. The tensile strength at yield can generally be greater than about 40 $N/mm^2$, such as greater than about 43 $N/mm^2$, and generally less than about 70 $N/mm^2$. The tensile strength at break can be greater than about 40 $N/mm^2$, such as greater than about 43 $N/mm^2$, and generally less than about 70 $N/mm^2$. The elongation at break can be greater than about 4%, such as greater than about 5%, and generally less than about 25%.

The present disclosure may be better understood with reference to the following examples.

EXAMPLES

Various polymer compositions were formulated in accordance with the present disclosure and tested for various properties. The following results were obtained.

TABLE 1

| Formulation | Norm ISO | Unit | 1 | 2 | 3 | 4 | 5 |
|---|---|---|---|---|---|---|---|
| Polybutylene Terephthalate (MVR17 $cm^3$/10 min) | | % | 85.6 | 80.9 | 78.4 | 77.9 | |
| Polybutylene Terephthalate (MVR38 $cm^3$/10 min) | | % | | | | | 77.9 |

TABLE 1-continued

| Formulation | Norm ISO | Unit | 1 | 2 | 3 | 4 | 5 |
|---|---|---|---|---|---|---|---|
| PTFE | | % | 0.5 | 0.5 | 0.5 | 0.5 | 0.5 |
| Aluminum phosphite | | % | | | 3 | 3 | 3 |
| Aluminum diethyl phosphinate | | % | 13.3 | | | | |
| Aluminum diethyl phosphinate and melamine cyanurate (contains 21.4 to 22.1 wt. % phosphorus) | | % | | 17.5 | 17.5 | 17.5 | 17.5 |
| Pentaerythritol tetrakis (3-(3,5-di-tert-butyl-4-hydroxyphenyl) propionate) | | % | 0.1 | 0.1 | 0.1 | 0.1 | 0.1 |
| Bis-(2,4-di-t-butylphenol) Pentaerythritol Diphosphite | | % | 0.2 | 0.2 | 0.2 | 0.2 | 0.2 |
| Montanic acid triol ester | | % | 0.3 | 0.3 | 0.3 | 0.3 | 0.3 |
| Titanate coupling agent | | % | | 0.5 | | 0.5 | 0.5 |
| Total | | % | 100 | 100 | 100 | 100 | 100 |
| MVR 250° C./2.16 kg | 1133 | $cm^3$/10 min | 6.5 | 8 | 4.5 | 6.0 | 11.5 |
| Tensile Modulus | 527-1/2 | MPa | 3370 | 3440 | 3630 | 3535 | 3655 |
| Tensile Strength at Yield | 527-1/2 | MPa | 50 | 45.0 | 45.5 | 44.5 | 44.5 |
| Tensile Strength at Break | 527-1/2 | MPa | 45.5 | 42.5 | 43.5 | 42 | 43 |
| Elongation @ Break | 527-1/2 | % | 18.5 | 9.5 | 8 | 9.5 | 5 |
| Vertical Burning (0.8 mm) | | Rating | V0 | V0 | V0 | V0 | V0 |
| Vertical Burning (0.4 mm) | | Rating | V2 | V2 | V0 | V0 | V0 |
| GWIT (0.4 mm) | | ° C. | 725 | 775 | 800 | 775 | 775 |
| CTI using Solution A | | Rating | 600 | 600 | 600 | 600 | 600 |

The titanate coupling agent used in Sample Nos. 4 and 5 was titanium IV 2-propanolato,tris(dioctyl)phosphato-O.

As shown above, Sample Nos. 3-5 had a V-0 rating even at a thickness of 0.4 mm. Further, samples containing the titanate coupling agent demonstrated dramatically better melt flow properties.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A flame resistant polymer composition consisting of:

polybutylene terephthalate present in the polymer composition in an amount greater than about 70% by weight and less than about 97% by weight;

a flame retardant composition of a combination of a metal phosphinate, a metal phosphite, and a nitrogen-containing synergist;

an organometallic compatibilizer of a titanate present in an amount from about 0.05% by weight to about 2.8% by weight; and optionally, one or more components selected from the group consisting of fluoropolymers, stabilizers, lubricants, colorants, secondary amines, esters of a carboxylic acid, and organophosphorus compounds;

wherein the metal phosphinate is present in the flame resistant polymer composition in an amount from about 10% to about 25% by weight, the metal phosphite is present in the flame resistant polymer composition in an amount from about 1% to about 7% by weight, and the nitrogen-containing synergist is present in the flame resistant polymer composition in an amount from about 0.1% to about 4% by weight; and wherein the flame resistant polymer composition displays a V-O rating at a thickness of 0.4 mm when tested according to Underwriters Laboratories Test 94 and a melt flow rate of at least 5 $cm^3$/10 min when tested at 250° C. and at a load of 2.16 kg.

2. The flame resistant polymer composition as defined in claim 1, wherein the metal phosphite is aluminum phosphite.

3. The flame resistant polymer composition as defined in claim 2, wherein the aluminum phosphite has the following chemical formula: $Al_2(HPO_3)_3$.

4. The flame resistant polymer composition as defined in claim 1, wherein the metal phosphinate is a dialkyl phosphinate.

5. The flame resistant polymer composition as defined in claim 1, wherein the metal phosphinate is an aluminum diethyl phosphinate.

6. The flame resistant polymer composition as defined in claim 1, wherein the nitrogen-containing synergist is melamine cyanurate.

7. The flame resistant polymer composition as defined in claim 1, wherein the metal phosphinate is present in the flame resistant polymer composition in an amount from about 12% to about 19% by weight, the metal phosphite being present in the flame resistant polymer composition in an amount from about 2% to about 5% by weight, and the nitrogen-containing synergist being present in the flame resistant polymer composition in an amount from about 0.5% to about 2.3% by weight.

8. The flame resistant polymer composition as defined in claim 1, wherein the organometallic compatibilizer is titanium IV 2-propanolato, tris(dioctyl)phosphato-O.

9. The flame resistant polymer composition as defined in claim 1, wherein the organometallic compatibilizer is present in the flame resistant polymer composition in an amount from about 0.05% to about 2.5% by weight.

10. The flame resistant polymer composition as defined in claim 1, wherein the ester of a carboxylic acid is present in the flame resistant polymer composition.

11. The flame resistant polymer composition as defined in claim 10, wherein the ester of the carboxylic acid is a reaction product of a montanic acid with a multi-functional alcohol.

12. The flame resistant polymer composition as defined in claim 1, wherein the flame resistant polymer composition has a melt flow rate of at least 10 $cm^3$/10 min when tested at a temperature of 250° C. and at a load of 2.16 kg.

13. The flame resistant polymer composition as defined in claim 1, wherein the flame resistant polymer composition displays a CTI of at least 600 volts.

14. The flame resistant polymer composition as defined in claim 1, wherein the flame resistant polymer composition exhibits an elongation at break of greater than about 4% when tested according to ISO Test No. 527.

15. The flame resistant polymer composition as defined in claim 1, wherein the fluoropolymer is present in the flame resistant polymer composition.

16. The flame resistant polymer composition as defined in claim 15, wherein the fluoropolymer is polytetrafluoroethylene.

17. The flame resistant polymer composition as defined in claim 16, wherein the polytetrafluoroethylene has an average particle size of from about 1 micron to about 15 microns and a density from about 300 g/l to about 450 g/l as determined according to ASTM D4895.

18. The flame resistant polymer composition as defined in claim 1, wherein the polybutylene terephthalate is present in the flame resistant polymer composition in an amount greater than 75% by weight and less than 80% by weight.

19. The flame resistant polymer composition as defined in claim 16, wherein the polytetrafluoroethylene is present in the flame resistant polymer composition in an amount from about 0.1% to about 5% by weight.

20. A flame resistant polymer composition consisting of:

polybutylene terephthalate present in the flame resistant polymer composition in an amount greater than about 70% by weight and less than about 97% by weight;

a flame retardant composition of a combination of a metal phosphinate, a metal phosphite, and a nitrogen-containing synergist;

an organometallic compatibilizer of a titanate in an amount from about 0.05% by weight to about 2.8% by weight;

polytetrafluoroethylene in an amount from about 0.1% to about 5% by weight; and optionally, one or more components selected from the group consisting of stabilizers, lubricants, colorants, secondary amines, esters of a carboxylic acid, and organophosphorus compounds;

wherein the metal phosphinate is present in the flame resistant polymer composition in an amount from about 10% to about 25% by weight, the metal phosphite being present in the flame resistant polymer composition in an amount from about 1% to about 7% by weight, and the nitrogen-containing synergist being present in the flame resistant polymer composition in an amount from about 0.3% to about 4% by weight.

21. The flame resistant polymer composition as defined in claim 20, wherein the metal phosphinate is present in the flame resistant polymer composition in an amount from about 12% to about 19% by weight, the metal phosphite being present in the flame resistant polymer composition in an amount from about 2% to about 5% by weight, and the nitrogen-containing synergist being present in the flame resistant polymer composition in an amount from about 0.5% to about 2.3% by weight.

* * * * *